United States Patent [19]

Hohberg

[11] Patent Number: 4,707,596
[45] Date of Patent: Nov. 17, 1987

[54] ARTICULATED OPTICAL SYSTEM HAVING AN ARRANGEMENT FOR CORRECTING THE POSITION OF A LASER BEAM

[75] Inventor: Gerhard Hohberg, Oberkochen, Fed. Rep. of Germany

[73] Assignee: Carl-Zeiss-Stiftung, Heidenheim, Fed. Rep. of Germany

[21] Appl. No.: 896,140

[22] Filed: Aug. 12, 1986

[30] Foreign Application Priority Data

Aug. 23, 1985 [DE] Fed. Rep. of Germany ....... 3530189

[51] Int. Cl.$^4$ .................... G05D 3/12; B23K 26/04
[52] U.S. Cl. .................... 250/201; 219/121 LU; 356/152
[58] Field of Search ..... 250/201 R, 201 AF, 201 DF; 219/121 LV, 121 LU, 121 LW, 121 LX, 121 LN; 356/141, 152; 372/12, 14–16

[56] References Cited

U.S. PATENT DOCUMENTS

| | | | |
|---|---|---|---|
| 4,117,319 | 9/1978 | White, III | 356/141 |
| 4,129,775 | 12/1978 | O'Meara | |
| 4,349,732 | 9/1982 | Whitby et al. | 250/201 |
| 4,473,074 | 9/1984 | Vassiliadis | |
| 4,576,480 | 3/1986 | Travis | 356/152 |
| 4,618,759 | 10/1986 | Müller et al. | 356/152 |
| 4,659,916 | 4/1987 | Müller et al. | 250/201 |

FOREIGN PATENT DOCUMENTS

| | | |
|---|---|---|
| 0048364 | 4/1985 | European Pat. Off. |
| 2645393 | 4/1977 | Fed. Rep. of Germany |
| 2757585 | 10/1981 | Fed. Rep. of Germany |
| 3202432 | 8/1983 | Fed. Rep. of Germany |
| 56-066395 | 6/1981 | Japan |
| 57-004393 | 1/1982 | Japan |
| 57-154389 | 9/1982 | Japan |
| 57-164445 | 10/1982 | Japan |
| 58-224088 | 12/1983 | Japan |

Primary Examiner—Edward P. Westin
Assistant Examiner—Khaled Shami
Attorney, Agent, or Firm—Walter Ottesen

[57] ABSTRACT

At its exit end, an articulated optical system contains a triple mirror which reflects part of the laser beam into itself and back to a detector disposed in the vicinity of the entry of the articulated optical system. The detector signal is delivered to an adjusting mirror also disposed at the entry of the articulated optical system. The adjusting mirror compensates for drifting of the laser beam caused by errors in the telescopic guides and bearings of the articulated arm. Since the laser beam, after reflection at the triple mirror, is returned once again by means of all the movable elements of the articulated arm, the directional association between the displacement measured by the detector and the follow-up adjusting movement of the adjusting mirror remains independent of the amount of rotation in the joints.

9 Claims, 1 Drawing Figure

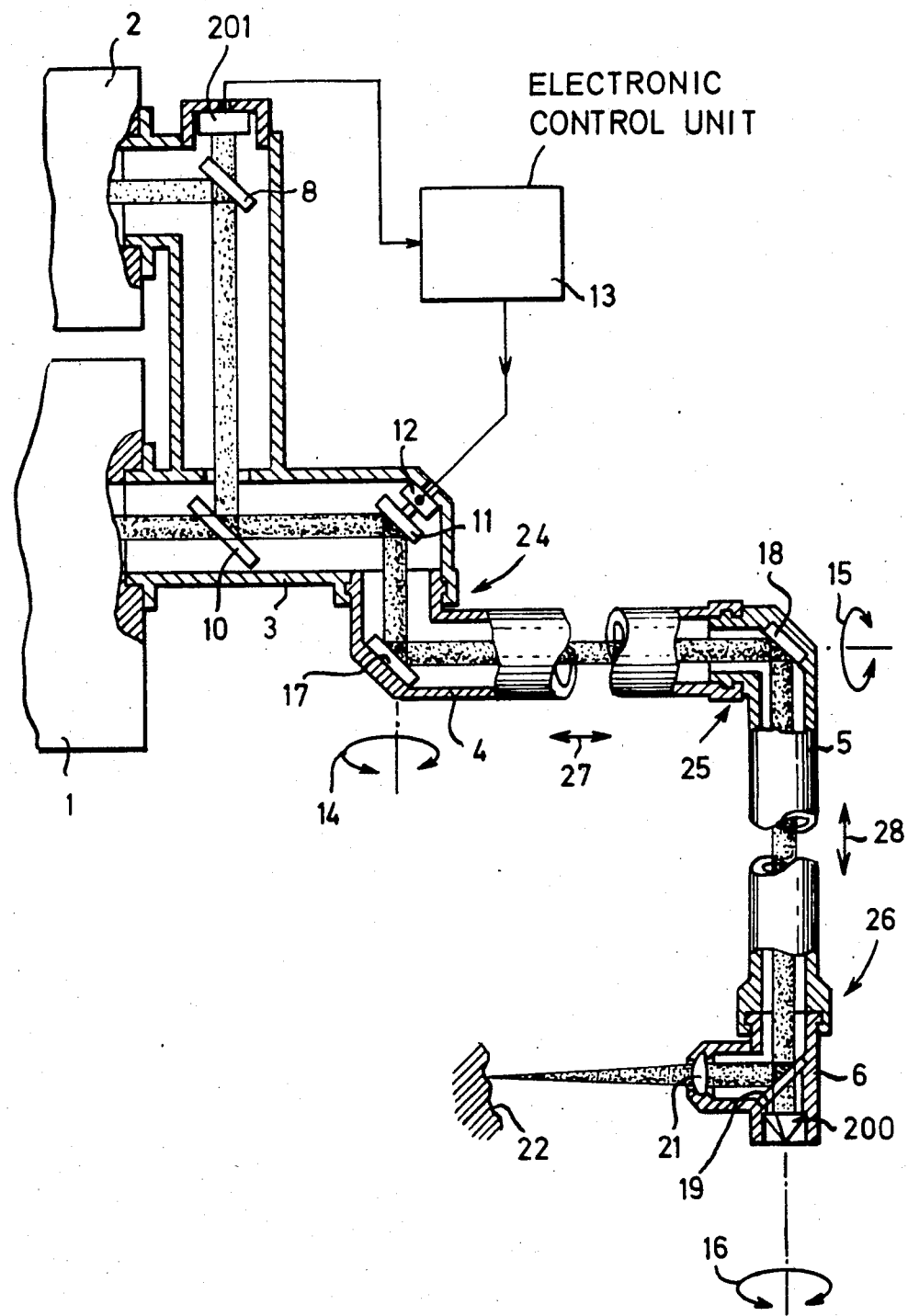

ARTICULATED OPTICAL SYSTEM HAVING AN ARRANGEMENT FOR CORRECTING THE POSITION OF A LASER BEAM

BACKGROUND OF THE INVENTION

For guiding laser beams, it is customary to use either light conductors in the form of flexible glass fibers or transmission systems containing optical deflectors such as mirrors. Particularly in medical applications such as laser surgery, for example, articulated transmission systems of the last-mentioned type are frequently used because so far there are no fiber cables which are sufficiently resistant to rupture while at the same time providing for a sufficiently low-loss transmission in the wavelength range of the carbon-dioxide lasers predominantly used in these applications.

The articulated arms used for guiding the laser beam include a series of deflection mirrors secured to rotatable joints such that each mirror is rotatable about the axis of the incident laser beam together with the follow-on part of the pivot arm. In addition, telescope guides are often inserted between the joints thereby enabling the length of the arm to be changed. Articulated arms having as many as seven rotatable joints are known.

Apart from being dependent on a sufficiently precise adjustment of the mirrors, the proper function of such an articulated arm depends on the quality of the pivot bearings and telescopic guides as well as on the rigidity of their connections. The problems associated therewith become greater as the dimensions of the work area covered by the articulated arm increase. Adding more rigidity to the arm requires stronger material and, accordingly, larger masses to be moved. This puts an increased load on the pivot bearings and impairs handling, particularly in dynamic operation.

If, however, guidance errors occur, the beam will wander from its predetermined beam path. First of all, this will cause the laser focus to shift which is not particularly disturbing within certain limits, especially if the focus position is visually evaluated by means of a reflected pilot beam. Where long articulated arms are used, the situation can occur that the laser beam within the articulated optical system wanders out of the free openings of the deflection mirrors or the focusing optics and impinges on their mountings. In this event, high-performance lasers will destroy the optical system.

In laser systems for reading out the contents of information storage plates, it is known to provide control arrangements which make the focus of the laser beam follow a predetermined track radially. These control arrangements, however, evaluate the deviation of the focus from the visibly marked data track. In addition, there exists a fixed spatial relationship between the direction of movement of the positioning member and that of the laser focus. However, if the laser beam is guided via several articulated joints, the angle of rotation of each individual joint has to be taken into consideration when determining the relationship between the position coordinates of the focus and the positioning coordinates of the member performing the follow-up function. This is not easily possible since the complexity of the arrangement would increase considerably if each articulated joint were provided with an angle sensor of its own, particularly in articulated arms including several pivot axes.

Japanese patent publication Nos. JP-A-57-4393, JP-A-58-224088 and JP-A-57-154389 disclose regulating devices for laser machining tools by means of which the laser beam is prevented from wandering out of the axis of the optics guiding the beam. A position-sensitive detector disposed in the vicinity of the exit of the optical system is provided for recognizing the beam position, and a portion of the laser radiation is aimed at this detector. A positioning mirror preceding the optical system on the entry side is acted upon by the detector signal.

In these devices, the transmission path for the laser beam is fixed, so here also there is a fixed spatial association between the direction of movement of the positioning member and the deflection of the laser beam at the exit end. The known devices are not suitable for regulating the beam position of a laser beam guided via an articulated optical system capable of rotational movement. In U.S. Pat. No. 4,659,916 an apparatus for positional correction of a laser beam guided via an articulated optical system is described in which the direction of the laser beam is modulated by a swinging mirror disposed on the entry end. A detector at the exit of the articulated optical system provides a signal at the modulation frequency which enables the recognition of the rotational position of the articulated optical system that is required for regulation to be performed. Here, however, electrical supply lines leading to the movable end of the articulated optical system are necessary. The apparatus is also expensive, because of the parts required for modulation and demodulation of the beam direction.

SUMMARY OF THE INVENTION

It is an object of the invention to provide an articulated optical system for a power laser with an arrangement for correcting the position of the laser beam that is as inexpensive as possible and that operates independently of the angular position of the joints.

This object is attained in accordance with the invention in that a retroreflecting element (triple mirror) is disposed in the vicinity of the exit of the articulated optical system, and a position-sensitive detector on the entry end is disposed in the articulated optical system in such a way that it receives the radiation that is reflected back through the articulated optical system by the retroreflecting element.

Thus, according to a feature of the invention, a triple mirror is disposed at the exit of the articulated optical system which reflects the portion of the laser beam incident thereon back again through the articulated optical system. Since the portion of the laser beam no longer strikes the apex of the triple mirror if it wanders or drifts out of the axis of the articulated optical system, it undergoes a displacement at the triple mirror that is proportional to its drift and then travels back, parallel to the incident beam, in the course of which it is subjected to the same variations of its rotational position as the entering laser beam. As a result, the displacement measured by the position-sensitive detector at the entry of the articulated optical system is independent of the rotational position of the articulated optical system and can be further processed electronically without great expense for triggering the positioning member that is also disposed at the entry of the articulated optical system. A correct readjustment of the beam position is accordingly always possible notwithstanding the rotational movements taking place in the articulated arm and independently of the number of rotating joints used and yet without requiring that the beam direction be modulated.

The controllable beam deflector, that is, the adjusting member for regulating the beam position, preferably includes a mirror that is tiltable by piezoelectric means.

If an auxiliary or pilot laser, which is anyway required for visual recognition of the focus, is introduced via a mirror coaxially with the beam of the actual work laser, then it is suitable to arrange the retroreflecting element and the position-sensitive detector in the beam path of the pilot laser and to place the adjusting element in the common beam path of both lasers. Known photoelectric quadrant receivers may be advantageously used as position-sensitive detectors.

Further advantageous embodiments of the invention will become apparent from the subsequent description in conjunction with the drawing.

BRIEF DESCRIPTION OF THE DRAWING

The invention will now be described with reference to the drawing which is a schematic of an articulated optical system equipped with an embodiment of the arrangement according to the invention for correcting the position of the laser beam guided in the system.

DESCRIPTION OF THE PREFERRED EMBODIMENTS OF THE INVENTION

In the drawing, reference numeral 1 identifies the housing of a carbon-dioxide laser whose beam is directed via an articulated arm to a focusing lens 21. Focusing lens 21 is manually movable in several degrees of freedom and focuses the beam onto the surface of an object 22 not specified in more detail. The articulated optical system includes: a positionally fixed tube 3 flange connected to the housing 1; a second telescopically expandable tube 4 connected with tube 3 by means of a first rotational bearing 24 for permitting rotational movement; a third telescopically expandable tube 5 connected with tube 4 by means of a second rotational bearing 25; and, a cutting head 6 which accommodates the focusing lens 21 and is secured to tube 5 by means of a third rotational bearing 26. While arrows 14, 15 and 16 indicate the direction of rotation of bearings 24, 25 and 26, respectively, arrows 27 and 28 illustrate the directions in which the respective telescopically expandable parts 4 and 5 move.

Parts 4, 5 and 6 of the articulated arm are angled behind the respective ones of the rotational bearings 24, 25 and 26 about which they are rotatable with their follow-on parts. The parts 4, 5 and 6 accommodate deflection mirrors 17, 18 and 19, respectively, and guide the laser beam in the articulated arm. Further, positionally fixed part 3 of the articulated arm contains a wavelength-selective beam splitter 10 by means of which the beam of a pilot laser 2 is coupled into the articulated arm coaxially with the beam of the work laser 1. Pilot laser 2 indicates to the operator guiding the articulated arm the focus position of the invisible beam of the work laser 1 on the surface of the object 22. Mirror 19 via which work laser 1 is reflected into focusing lens 21 is likewise configured as a beam splitter and permits the unreflected passage of part (component beam) of the beam of pilot laser 2 for impingement on a triple mirror (retroreflector) 200 arranged behind the mirror.

The triple mirror 200 reflects the incident component beam of the pilot laser 2 back into itself. The retroreflected beam, via the wavelength-selective beam splitter 10, reaches a semi-transparent mirror 8 in the beam path of the pilot laser 2' on the entry end. Next, the component beam passes through the mirror 8 and strikes a position-sensitive detector 201 mounted behind the latter.

If the beams of the lasers 1 and 2 take an exactly central course with respect to the optical axis of the articulated arm, then the component beam of the pilot laser 2 passing through the splitter 19 strikes the apex of the triple mirror 200 and is reflected coaxially into itself. However, as soon as the component beam begins to wander, for instance because the telescoping guides are easily deformed when the articulated arm is actuated or because of concentricity errors in the pivot bearings 24 to 26, the component beam reflected at the triple mirror 200 undergoes a parallel displacement with respect to the incident beam, which is twice as great in magnitude as the drift of the incident beam out of the axis of the articulated optical system. This displacement is recognized by the detector 201.

The photosensitive surface of the detector 201 is divided into four sectors of equal size. The sectors of this detector emit dc light signals, the amplitudes of which do not differ from one another so long as the returning beam strikes the detector 201 centrally. If the beam is displaced, the amplitude ratios of the dc light signals of the four quadrants change. This change is proportional to the drift of the laser beam, which is guided via the articulated arm, out of the axis of the articulated optical system. An electronic circuit 13 evaluates the dc light signals and provides an adjusting signal for an adjusting mirror 11 disposed at the entry of the articulated arm. The drift of the rays of the carbon-dioxide laser and of the pilot laser 2 guided via this adjusting mirror 11 is compensated for by the deflection thereof.

Tube 3 is fixedly attached to the housing of laser 1 and the adjusting mirror 11 is secured to tube 3 via piezoelectric elements 12. It is clear, however, that the deflection of the mirror 11 may also be accomplished in other ways, such as via inductive adjusting elements; the only essential requirement is that the adjustability of the mirror 11 in two coordinates be assured. Piezoelectric adjusting mirrors are described, for example, in German patent No. 29 50 919.

Since the component beam of the pilot laser 2 reflected by the triple mirror 200 is guided back via the same optical elements, that is, mirrors 10, 11, 17, 18, as the beam striking the triple mirror 200, the azimuthal association between the displacement measured by the detector 201 and the direction of the readjusting movement at the adjusting mirror 11 is maintained independently of the rotational position of the elements 4, 5 and 6 of the articulated arm. Accordingly, a separate arrangement for ascertaining the rotational position of the articulated arm is unnecessary.

It is understood that the foregoing description is that of the preferred embodiments of the invention and that various changes and modifications may be made thereto without departing from the spirit and scope of the invention as defined in the appended claims.

What is claimed is:

1. In an articulated optical system having an input end and an output end and deflecting means defining a beam path therebetween for guiding a laser beam along an optical axis, an arrangement for correcting the position of said laser beam, the arrangement comprising:

beam-splitter means for splitting off a portion of the rays of the laser beam to form a component beam;

retroreflecting means for reflecting said component beam back to said input end;

both said retroreflecting means and said beam-splitter means being mounted in the region of said output end;

position-sensitive detector means arranged at said input end of said optical system for receiving said component beam and for generating a signal indicative of a displacement of said component beam from said optical axis;

a control unit for receiving said output signal of said detector means and for generating a control signal; and, adjustable beam deflecting means arranged in the region of said input end of said articulated optical system for adjusting the position of said laser beam in response to said control signal.

2. In the articulated optical system of claim 1, said retroreflecting means being a triple mirror.

3. In the articulated optical system of claim 1, said position-sensitive detector means being a quandrant receiver.

4. In the articulated system of claim 1, said adjustable beam deflecting means being a piezoelectric tiltable adjusting mirror.

5. In an articulated optical system having an input end and an output end and deflecting means defining a beam path therebetween for guiding a work laser beam along an optical axis, the articulated optical system being subjected to deformations which can cause the work laser beam to deviate from said beam path, an arrangment for correcting the position of said work laser beam, the arrangement comprising:

pilot laser beam generating means for generating a pilot laser beam having a multiplicity of rays;

coupling means for coupling said pilot laser beam into the work laser beam;

beam-splitter means for splitting off a portion of the rays of said pilot laser beam to form a component beam;

retroreflecting means for reflecting said component beam back to said input end;

both said retroreflecting means and said beam splitter means mounted in the region of said output end;

position-sensitive detector means arranged at said input end of said optical system for receiving said component beam and for generating a signal indicative of a displacement of said component beam from said beam path;

a control unit for receiving said output signal of said detector means for generating a control signal; and, adjustable beam deflecting means arranged in the region of said input end of said articulated optical system for adjusting the position of said work laser beam and said pilot laser beam in response to said control signal.

6. In the articulated optical system of claim 5, said coupling means being a wavelength-selective beam splitter.

7. In the articulated optical system of claim 5, said retroreflecting means being a triple mirror.

8. In the articulated optical system of claim 5, said position-sensitive detector means being a quadrant receiver.

9. In the articulated optical system of claim 5, said adjustable beam deflecting means being a piezoelectric tiltable adjusting mirror.

* * * * *